United States Patent
Reider et al.

(10) Patent No.: US 10,225,756 B2
(45) Date of Patent: Mar. 5, 2019

(54) TECHNIQUE FOR REPORTING OUT-OF-COVERAGE EVENTS IN WIRELESS COMMUNICATION

(71) Applicant: Telefonaktiebolaget LM Ericsson (publ), Stockholm (SE)

(72) Inventors: Norbert Reider, Tényö (HU); Fredrik Gunnarsson, Linköping (SE); Bo Hagerman, Tyresö (SE); Sara Landström, Luleå (SE); Bengt Lindoff, Bjärred (SE); Robert Petersen, Linköping (SE); András Rácz, Budapest (HU); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/128,128

(22) PCT Filed: Apr. 7, 2015

(86) PCT No.: PCT/EP2015/057480
§ 371 (c)(1),
(2) Date: Sep. 22, 2016

(87) PCT Pub. No.: WO2015/158567
PCT Pub. Date: Oct. 22, 2015

(65) Prior Publication Data
US 2017/0105136 A1    Apr. 13, 2017

(30) Foreign Application Priority Data

Apr. 15, 2014 (EP) .................................. 14001371

(51) Int. Cl.
*H04W 24/10* (2009.01)
*H04W 76/10* (2018.01)
(Continued)

(52) U.S. Cl.
CPC .......... *H04W 24/10* (2013.01); *H04W 24/02* (2013.01); *H04W 24/04* (2013.01);
(Continued)

(58) Field of Classification Search
CPC . H04W 24/10; H04W 84/042; H04W 76/046; H04W 72/085; H04W 76/04;
(Continued)

(56) References Cited

U.S. PATENT DOCUMENTS 8,571,542 B2 * 10/2013 Wu ........................ H04W 24/10
                                                                 455/423
8,780,698 B2 *  7/2014 Yi ......................... H04W 56/00
                                                                 370/218
(Continued)

FOREIGN PATENT DOCUMENTS

CN     102685672 A     9/2012
EP     2360962 A2      8/2011
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 11)", Technical Specification, 3GPP TS 36.304 V11.5.0, Sep. 1, 2013, pp. 1-34, 3GPP, France.
(Continued)

*Primary Examiner* — Meless N Zewdu
(74) *Attorney, Agent, or Firm* — Sage Patent Group

(57) ABSTRACT

A technique for reporting events from a mobile device to a cellular network (100) is provided. The mobile device is wirelessly connectable to the cellular network (100). As to a method aspect of the technique, records of the events are stored while the mobile device is out of network coverage.
(Continued)

The stored records are reported to the cellular network (100) when the mobile device is wirelessly connected to the cellular network (100).

21 Claims, 5 Drawing Sheets

(51) Int. Cl.
| | | |
|---|---|---|
| H04W 76/18 | (2018.01) | |
| H04W 24/02 | (2009.01) | |
| H04W 24/04 | (2009.01) | |
| H04W 36/00 | (2009.01) | |
| H04W 76/19 | (2018.01) | |
| H04W 72/04 | (2009.01) | |
| H04W 72/08 | (2009.01) | |
| H04W 76/27 | (2018.01) | |
| H04W 88/08 | (2009.01) | |
| H04W 52/02 | (2009.01) | |
| H04W 88/18 | (2009.01) | |
| H04W 88/00 | (2009.01) | |
| H04W 8/08 | (2009.01) | |
| H04W 76/00 | (2018.01) | |
| H04W 88/02 | (2009.01) | |
| H04W 40/18 | (2009.01) | |
| H04W 84/04 | (2009.01) | |

(52) U.S. Cl.
CPC ....... *H04W 36/0058* (2018.08); *H04W 72/04* (2013.01); *H04W 72/085* (2013.01); *H04W 76/10* (2018.02); *H04W 76/18* (2018.02); *H04W 76/19* (2018.02); *H04W 76/27* (2018.02); *H04W 8/08* (2013.01); *H04W 8/082* (2013.01); *H04W 40/18* (2013.01); *H04W 52/0232* (2013.01); *H04W 52/0248* (2013.01); *H04W 52/0251* (2013.01); *H04W 72/08* (2013.01); *H04W 76/00* (2013.01); *H04W 84/042* (2013.01); *H04W 88/00* (2013.01); *H04W 88/02* (2013.01); *H04W 88/08* (2013.01); *H04W 88/18* (2013.01)

(58) Field of Classification Search
CPC ... H04W 72/08; H04W 76/00; H04W 76/028; H04W 76/025; H04W 76/027; H04W 24/00; H04W 24/02; H04W 24/06; H04W 24/08; H04W 16/00; H04W 16/18
USPC ......................................................... 455/450
See application file for complete search history.

(56) References Cited

U.S. PATENT DOCUMENTS

| | | | | |
|---|---|---|---|---|
| 9,042,881 B2* | 5/2015 | Kwon | .................. | H04B 1/1027 370/242 |
| 9,265,076 B2* | 2/2016 | Schmidt | .................. | H04W 4/70 |
| 2004/0180663 A1* | 9/2004 | Manzanares | .......... | H04W 24/00 455/445 |
| 2007/0255979 A1* | 11/2007 | Deily | .................. | G06F 11/3476 714/45 |
| 2011/0195668 A1* | 8/2011 | Lee | ....................... | H04W 24/10 455/67.11 |
| 2011/0250880 A1* | 10/2011 | Olsson | .................. | H04W 76/18 455/423 |
| 2012/0040621 A1 | 2/2012 | Jung et al. | | |
| 2012/0083263 A1* | 4/2012 | Kim | .................... | H04W 72/085 455/423 |
| 2012/0106356 A1* | 5/2012 | Johansson | ............. | H04W 24/08 370/241.1 |
| 2012/0127876 A1* | 5/2012 | Hunukumbure | ...... | H04W 24/00 370/252 |
| 2012/0309404 A1* | 12/2012 | Suzuki | .................. | H04W 24/10 455/450 |
| 2013/0178211 A1 | 7/2013 | Wang et al. | | |
| 2013/0294281 A1* | 11/2013 | Lee | ....................... | H04W 24/10 370/252 |
| 2014/0051428 A1* | 2/2014 | Jung | .................... | H04W 24/08 455/422.1 |
| 2014/0051429 A1* | 2/2014 | Jung | .................... | H04W 24/08 455/422.1 |
| 2014/0228018 A1* | 8/2014 | Zhang | .................. | H04W 24/08 455/425 |
| 2014/0301277 A1* | 10/2014 | Ueda | .................... | H04W 24/02 370/328 |
| 2015/0056981 A1* | 2/2015 | Song | .................... | H04W 24/04 455/423 |

FOREIGN PATENT DOCUMENTS

| | | |
|---|---|---|
| EP | 2559285 A1 | 2/2013 |
| EP | 2627112 A1 | 8/2013 |
| WO | 2011128819 A1 | 10/2011 |
| WO | 2012047070 A2 | 4/2012 |
| WO | 2014048474 A1 | 4/2014 |

OTHER PUBLICATIONS

3rd Generation Partnership Project, "3rd Generation Partnership Project; Technical Specification Group Services and System Aspects; Telecommunication management; Subscriber and equipment trace; Trace control and configuration management (Release 11)", Technical Specification, 3GPP TS 32.422 V11.8.1, Jul. 1, 2013, pp. 1-133, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V11.5.0, Sep. 1, 2013, pp. 1-220, 3GPP, France.

3rd Generation Partnership Project, "3rd Generation Partnership Project; Technical Specification Group Services and System Aspects; Telecommunication management; Trace Management Integration Reference Point (IRP); Information Service (IS) (Release 11)", Technical Specification, 3GPP TS 32.442 V11.6.0, Mar. 1, 2013, pp. 1-31, 3GPP, France.

3rd Generation Partnership Project, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)", Technical Specification, 3GPP TS 37.320 V11.3.0, Mar. 1, 2013, pp. 1-23, 3GPP, France.

3rd Generation Partnership Project,"3rd Generation Partnership Project; Technical Specification Group Radio Access Network; User Equipment (UE) procedures in idle mode and procedures for cell reselection in connected mode (Release 11)", Technical Specification, 3GPP TS 25.304 V11.4.0, Sep. 1, 2013, pp. 1-53, 3GPP, France.

Kyocera, "MDT Accessibility measurement, logging and reporting", 3GPP TSG-RAN WG2 #78, Prague, Czech Republic, May 21, 2012, pp, 1-4, R2-122784, 3GPP.

* cited by examiner

TECHNIQUE FOR REPORTING OUT-OF-COVERAGE EVENTS IN WIRELESS COMMUNICATION

TECHNICAL FIELD

The present disclosure generally relates to a technique for reporting events from a mobile device to a cellular network. More specifically, and without limitation, the disclosure relates to a technique for Minimization of Drive Tests (MDT) based on events recorded in a Radio Resource Control (RRC) idle mode.

BACKGROUND

The coverage provided by a cellular network is an important characteristic of the cellular network. Building a cellular network for complete coverage requires changing or adding cells by building base stations, which are also referred to as eNodeBs in an LTE implementation. However, to improve coverage, it is difficult to determine the correct position, optimal transmission power and emission direction for the base stations. Depending on geographic topography and areas available for new base stations, it is often difficult to deploy a cellular network without any "coverage holes". Furthermore, information about the existence of such coverage holes is hard to obtain in a systematic way, since conventional techniques, such as Minimization of Drive Tests (MDT), allow collecting coverage information only if a mobile terminal has measurements available and is in a state of connectivity with the network in order to report signal quality.

Conventional MDT functionalities collect measurement results in an idle mode of the mobile terminal, only when the mobile terminal is in a "camped normally" state of the Radio Resource Control (RRC) idle mode, as specified in document 3GPP TS 36.304, Release 11. The conventionally reported information is, however, not sufficient to discover all coverage problems experienced by the mobile terminal in the idle mode.

Moreover, conventional Radio Link Failure (RLF) reports triggered by a radio link failure, e.g., during a handover, only contain measurement information related to the serving cell before the failure occurred and information about the recovery cell after recovery from the radio link failure. The RLF reports do, however, not include any information related to the time the mobile terminal spends in the RRC idle mode after the failure trying to find a suitable cell.

Document EP 2 559 285 A1 describes in one embodiment a mobile terminal performing MDT measurements. When a radio link failure occurs, the mobile terminal adds MDT measurement information to the RLF report sent to the network. In another embodiment, the mobile terminal detects that no reporting channel is available for reporting MDT measurement information and stores the MDT measurement information. After detecting the existence of a reporting channel, the stored unreported MDT measurement information is reported to the cellular network.

Document CN 102 685 672 A describes a mobile terminal recording information about a radio link failure and geographic information when the radio link failure occurs. The recorded information is reported to the network side in the RLF report.

Document EP 2 360 962 A2 discloses a technique for performing MDT measurements, such as periodic downlink pilot measurements, in a mobile communication network. A user equipment (UE) receives configuration information from a network to perform logging of measurements in an idle mode. The configuration information includes a logging duration, as well as an activation and a deactivation condition for the MDT measurement. The UE then performs the MDT measurement based on the activation and deactivation condition. When the UE encounters coverage holes or failures, it reports to the network immediately after the situation improves.

Document WO 2012/047070 A2 discloses a method for collecting information using a Minimization of Drive Tests (MDT) in a wireless communication system by setting a log environment based on a log configuration request message. MDT can be performed in a periodic mode, an event triggered mode, or a combination thereof. MDT results are logged, and the created log is reported to a source base station. A method is disclosed for controlling MDT measurements when handover of the mobile device is performed.

Document EP 2 627 112 A1 provides a radio measurement collection method, wherein a radio-environment measurement is performed in an idle state on a target LTE frequency band, a frequency band for a non-LTE radio access technology (RAT) and/or an LTE frequency band other than the target frequency band. Depending on a threshold value, the measurements of the LTE frequency band and the non-LTE RAT can be logged individually or combined, together with location information.

Document WO 2014/048474 A1 discloses a method for enhanced network management in the case of a communication failure between an Element Management System and a super-ordinate Network Management System. Once a failure occurs, the Element Management System is switched over to forward event reports to a predefined peer Element Management System. In case the communication is reestablished, the usual functionality is restored and the re-routing of event reports to the peer Element Management System is stopped.

SUMMARY

Accordingly, there is a need for a technique that provides to the cellular network information based on which coverage problems are discoverable in at least certain situations.

According to one aspect, a method of reporting events from a mobile device to a cellular network is provided. The mobile device is wirelessly connectable to the cellular network. The method comprises a step of storing records of the event while the mobile device is out of network coverage; and a step of reporting the stored records to the cellular network when the mobile device is wirelessly connected to the cellular network.

The mobile device may be considered as out of network coverage if the mobile device is in a Radio Resource Control (RRC) idle mode and not normally camped on a cell of the cellular network.

The mobile device may be considered as wirelessly connected if the mobile device is in an RRC connected mode.

The technique allows, at least in some implementations, to extend an existing logged Minimization of Drive Test (MDT) measurement in the RRC idle mode. In same or other implementations, the technique can extend existing Radio Link Failure (RLF) reports. The extension may relate to the storing of records of the events and/or to the reporting. The reported records can contribute to discovering coverage problems and/or support an optimization of RRC idle parameters.

The records may be stored while no coverage or access to the cellular network is available for the mobile device. The mobile device may be not in the state "normally camped", if the mobile device is not camped on any cell of the cellular network.

Alternatively or in addition, the mobile device may be not in the state "normally camped", if the mobile device is in a "camped on any cell" state or in an "any cell selection" state, e.g., according to Sect. 5.2.9 of standard document 3GPP TS 36.304 (Release 11). The mobile device may be considered not normally camped, if the mobile device is not camped on a cell of the cellular network according to a specific Public Land Mobile Network (PLMN) identity of the cell. The mobile device may be considered not normally camped on the cell, if the cell has been selected irrespectively of the PLMN identity of the cell. For example, the mobile device may be considered not normally camped, if the mobile device cannot monitor a paging channel of the cellular network, or if the mobile device is not camped on a cell of the cellular network for phone call reception.

The mobile device may continuously or periodically store records of the events, when the mobile device is in the RRC idle mode. The RRC idle mode may include a plurality of different states including the "camped normally" state, the "any cell selection" state and the "camped on any cell" state.

The mobile device may further store records of the events occurring directly before the mobile device is out of network coverage and/or after the mobile device is reconnected.

The recorded events may relate to a change of the RRC state and/or measurements performed by the mobile device. The RRC states may be changed within the RRC idle mode. For example, state transitions and/or results of the measurements may be recorded and reported.

The measurements may include measurements performed by sensors integrated into the mobile device. The reports may include sensor data.

The recorded events may include at least one of cell selection, cell reselection and reception of a PLMN identity provided by a cell. The measurement results may include at least one of a Reference Signal Received Power (RSRP) value, a Reference Signal Received Quality (RSRQ) value and sensor values. The sensor values may include Global Positioning System (GPS) coordinates and/or accelerometer data.

The records may further relate to Radio Access Technologies (RATs) that have been detected by the mobile device. The records may relate to RATs other than 3GPP cellular RATs, e.g., Wi-Fi according to the standard family IEEE 802.11, Bluetooth according to the standard IEEE 802.15.1 or according to the Bluetooth Special Interest Group, Near Field Communication (NFC), Radio-Frequency Identification (RFID), Zig-Bee according to the standard IEEE 802.15.4, Ultra-Wideband (UWB), etc.

The method may further comprise a step of receiving, from the cellular network at the mobile device, a configuration message including a configuration command. The configuration command may configure the mobile device to store the records, while the mobile device is out of coverage, e.g., in the RRC idle mode and/or not normally camped on a cell of the cellular network. The configuration message may specify which events are to be recorded. The configuration message may be an extension of a Logged Measurements Configuration RRC message, e.g., as part of an MDT measurement configuration. The configuration message may be an extension of a conventional configuration message according to standard document 3GPP TS 37.320 (Release 11).

The configuration message may specify a Minimization of Drive Test, MDT, Measurement Configuration. The configuration message may include an RRC Connection Reconfiguration message. The configuration command may specify an Immediate MDT measurement. Alternatively or in addition, the configuration message may include a Logged Measurement Configuration message. The configuration command may specify a Logged MDT measurement.

The records of the event may be stored and reported according to a Radio Access Network (RAN) protocol. Alternatively or in combination, the records of the event may be stored and reported according to an application protocol. In the latter case, storing and/or reporting may be transparent to the RAN protocol.

The records may relate to state transitions in the RRC idle mode, e.g., due to a cell selection procedure or a cell reselection procedure. The measurements may relate to signal strength measured by the mobile device for cell candidates. The reported records may indicate whether or not the mobile device found a suitable cell with strong enough signal strength for each cell selection procedure and/or cell reselection procedure. The measurements may relate to different frequencies and/or different RATs (e.g., other than those of a source cell) of potential destination cells. The records may indicate a cause of the radio link failure, e.g., whether a handover occurred and/or if a timer (and, e.g., which timer) has expired. The stored records may be reported as part of a Radio Link Failure (RLF) report.

Some or each of the records and/or reports may include a timestamp. Each report may include one or more records.

According to a further aspect, a method of receiving event reports from a mobile device at a cellular network is provided. The mobile device is wirelessly connectable to the cellular network. The method comprises a step of sending, from the cellular network to the mobile device, a configuration message for configuring the mobile device to store records of the events while the mobile device is out of network coverage; and a step of receiving, from the mobile device at the cellular network, the stored records when the mobile device is wirelessly connected to the cellular network.

The configuration message may configure the mobile device to store the records of events in a Radio Resource Control, RRC, idle mode if the mobile device is not normally camped on a cell of the cellular network. The cellular network may receive the records when the mobile device is in an RRC connected mode.

The configuration message may be sent via a Northbound Interface, Itf-N.

A plurality of configuration messages may be sent. The configuration messages may be sent to a plurality of different mobile devices. A plurality of stored records may be received. The records may be received from a plurality of different mobile devices. The method may further include analyzing the plurality of received records. The analysis may include associating (e.g., grouping) the records according to time and/or locations. The analysis may include identifying areas of insufficient or lacking radio coverage.

According to a further aspect, a device for reporting events from a mobile device to a cellular network is provided. The mobile device is wirelessly connectable to the cellular network. The device comprises a storing unit adapted to store records of the events, while the mobile device is out of network coverage; and a reporting unit adapted to report the stored records to the cellular network when the mobile device is wirelessly connected to the cellular network.

According to a still further aspect, a device for receiving event reports from a mobile device at a cellular network is provided. The mobile device is wirelessly connectable to the cellular network. The device comprises a sending unit adapted to send, from the cellular network from the mobile device, a configuration message for configuring the mobile device to store records of the events while the mobile device is out of network coverage; and a receiving unit adapted to receive, from the mobile device at the cellular network, the stored records when the mobile device is wirelessly connected to the cellular network.

The devices may further be adapted to perform any of the steps disclosed herein in the context of the method aspects.

According to a software aspect, a computer program product is provided. The computer program product is adapted to perform one or more of the steps disclosed herein when executed on one or more computing devices. The computer program product may be stored on a computer-readable recording medium and/or may be provided for download via a computer network, e.g., the cellular network or the Internet, to such a computer-readable recording medium.

BRIEF DESCRIPTION OF THE DRAWINGS

In the following, the present disclosure is described in more detail with reference to exemplary embodiments illustrated in the drawings, wherein FIG. 1 schematically illustrates a cellular network.

DETAILED DESCRIPTION

In the following description, for purposes of explanation and not limitation, specific details are set forth, such as specific device and system configurations and specific methods, steps and functions, in order to provide a thorough understanding of the technique presented herein. It will be appreciated by the skilled person that the technique may be practiced in other embodiments that depart from these specific details. For example, while cellular networks, network nodes, mobile devices and communication protocols described herein are consistent with 3GPP Long Term Evolution (LTE), the technique is also applicable in networks using any other Radio Access Technology (RAT), such as the Global System for Mobile Communications (GSM) and the Universal Mobile Telecommunications System (UMTS). Furthermore, the technique is applicable in cellular implementations of non-3GPP networks including Wi-Fi access points according to the standard family IEEE 802.11 and/or in mixed networks allowing for a Media Independent Handover according to the standard IEEE 802.21. The cellular structure may include Wi-Fi hotspots.

Those skilled in the art will further appreciate that the methods, steps and functions described herein may be implemented using individual hardware circuitry, using software functioning in conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

Figure 1:
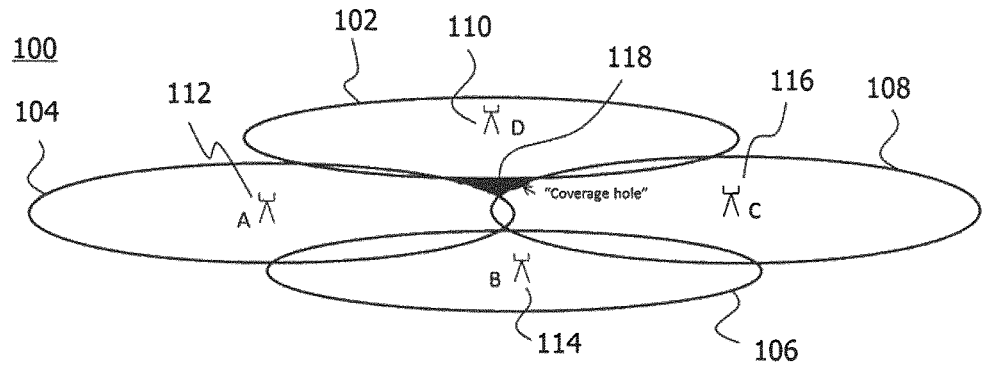

FIG. 1 schematically illustrates a cellular network 100 including a plurality of cells 102, 104, 106 and 108, each of which includes a base station 110, 112, 114 and 116, respectively. Each of the cells 102 to 108 effectively covers a cell area, as is schematically indicated by ellipses in FIG. 1. While neighboring pairs of the cells 102 to 108 seamlessly overlap, such as the pair of neighboring cells 104 and 106, an area 118 between the triple of cells 102, 104 and 108 is not sufficiently covered by the cellular network 100. The area 118 as also referred to as a "coverage hole".

Figure 2:
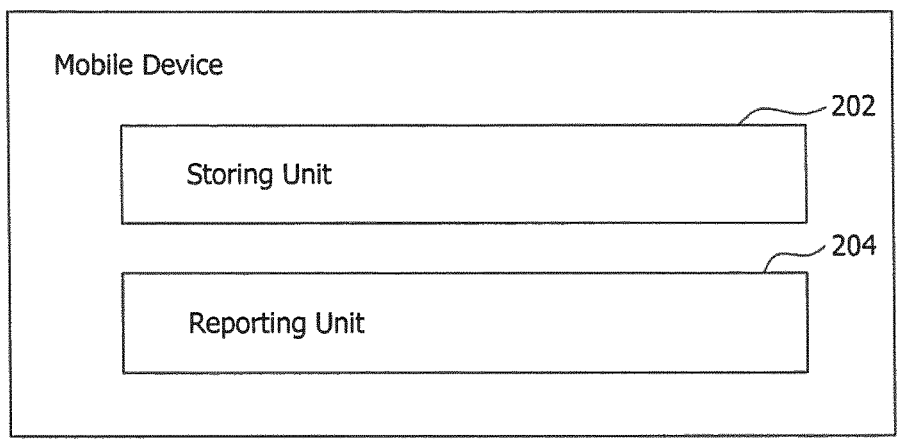
FIG. 2 shows a schematic block diagram of a mobile device wirelessly connectable to the cellular network of FIG. 1.

FIG. 2 shows a schematic block diagram of a device 200 for reporting events from a mobile device to a cellular network. The mobile device is wirelessly connectable to the cellular network, e.g., the cellular network 100 shown in FIG. 1. The device 200 may be implemented in the mobile device. The device 200 includes a storing unit 202 that stores records of events, when the mobile device is in a Radio Resource Control (RRC) idle mode and not normally camped on a cell of the cellular network. For example, the storing unit 202 stores records of the events while the mobile device 200 is in the coverage hole 118.

The device 200 further includes a reporting unit 204 that sends the stored records to the cellular network, when the mobile device is wirelessly connected to the cellular network in an RRC connected mode. For example, the reporting unit 204 sends the stored records, e.g., upon request by the cellular network 100, when the mobile device 200 leaves the coverage hole 118.

Figure 3:
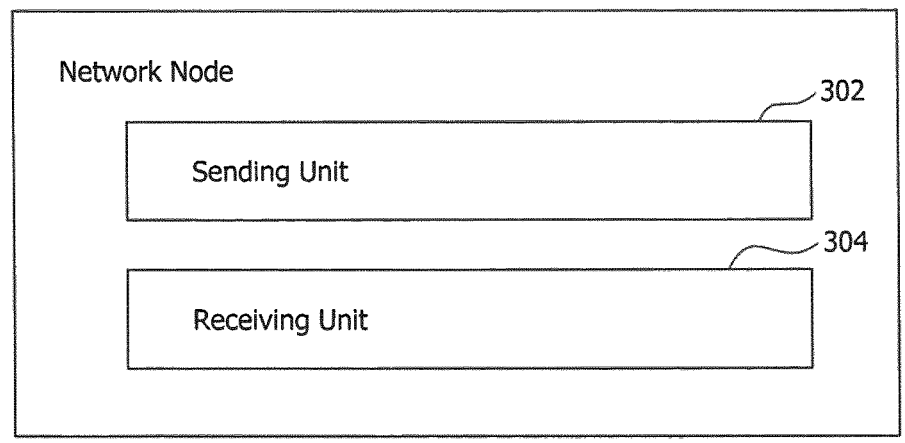
FIG. 3 shows a schematic block diagram of a node in the cellular network of FIG. 1.

FIG. 3 shows a schematic block diagram of a device 300 for receiving event reports from a mobile device at a cellular network, e.g., the cellular network 100 shown in FIG. 1. The mobile device (e.g., the mobile device 200) is wirelessly connectable to the cellular network. The device 300 may be a network node or a component thereof. The device 300 may be implemented in a network node of the cellular network 100, e.g., one or more of the base stations 110 to 116, a Mobility Management Entity (MME) and/or any other network node of an Evolved Packet Core in an LTE implementation of the cellular network 100.

The device 300 includes a sending unit 302 that sends a configuration message for configuring the mobile device 200 so as to store records of the events, while the mobile device 200 is in a Radio Resource Control (RRC) idle mode and not normally camped on a cell of the cellular network 100. For example, the configuration message may trigger the mobile device 200 to store records of the events, while the mobile device 200 is in the coverage hole 118.

The device 300 further includes a receiving unit 304 that receives the stored records from the mobile device 200, when the mobile device 200 is wirelessly connected to the cellular network 100 in an RRC connected mode. For example, the receiving unit 304 receives the stored records, e.g., upon request by the device 300, when the mobile device 200 leaves the coverage hole 118 and/or enters the cell 108.

Figure 4:
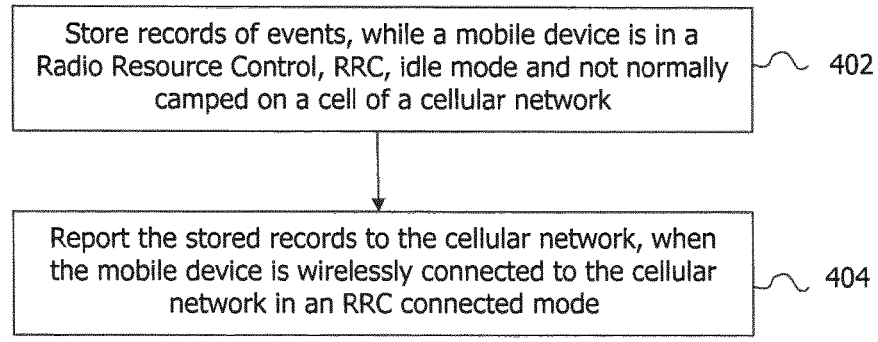
FIG. 4 shows a flowchart for a method of reporting events from the mobile device of FIG. 2 to the cellular network of FIG. 1.
Figure 5:
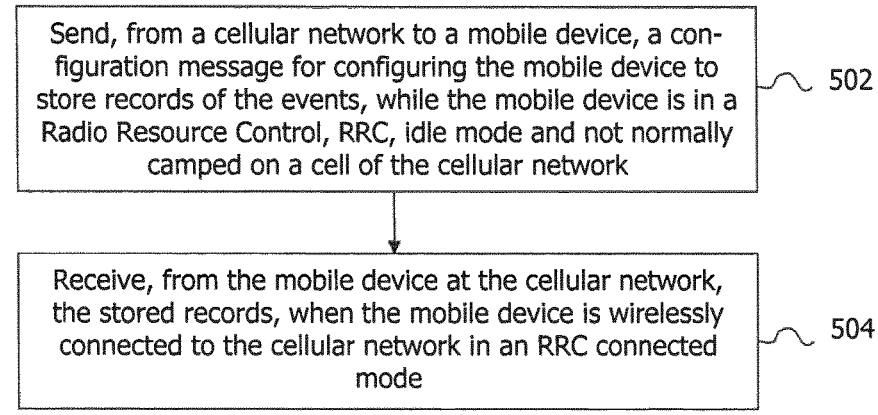
FIG. 5 shows a flowchart for a method of receiving event reports from the mobile device of FIG. 2 at the cellular network of FIG. 1.

FIGS. 4 and 5 show flowcharts of methods 400 and 500 for operating the devices 200 and 300, respectively. For example, the units 202 and 204 may perform the steps 402 and 404, respectively. The units 302 and 304 may perform the steps 502 and 504, respectively.

Figure 6:
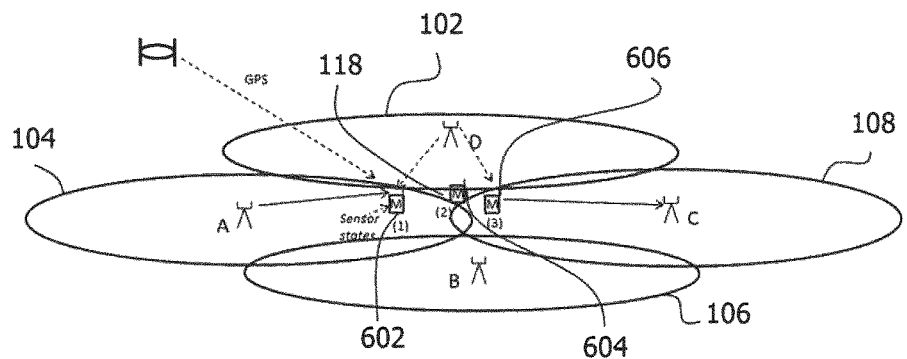
FIG. 6 shows an exemplary trajectory of the mobile device of FIG. 2 in the cellular network of FIG. 1.

FIG. 6 schematically illustrates a trajectory of the mobile device 200 within the cellular network 100. In a first situation 602, the mobile device 200 camps on the cell 104 in the RRC idle mode. Prior to entering the RRC idle mode, the mobile device 200 has been configured, according to the step 502 of the method 500, by the cellular network 100 to store records of events.

As the mobile device 200 approaches a boundary of the area covered by the cell 104, signal strength of the cell 102 is measured and compared with the signal strength measured for the cell 104. E.g., in an LTE implementation, the signal strength is measured in terms of Reference Signal Received Power (RSRP). In a WCDMA implementation (e.g., an UMTS implementation), the signal strength is measured in terms of Received Signal Code Power (RSCP).

Even if a Public Land Mobile Network (PLMN) identity provided by the cell 102 are suitable for the mobile device 200, RSRP values measured for both the cell 102 and the cell 104 become insufficient as the mobile device 200 enters the coverage hole 118, as is indicated for the situation at reference sign 604. Consequently, the mobile device 200 is not normally camped on a cell of the cellular network 100 as long as the mobile device is in the coverage hole 118. The mobile device 200 periodically measures and stores the RSRP values of the cells 102, 104 and 108 according to the step 402 of the method 400, while the mobile device 200 traverses the coverage hole 118.

As soon as the RSRP value measured for the cell 108 is sufficient, the mobile device 200 normally camps on the cell 108, which provides a PLMN identity suitable for the mobile device 200. The mobile device 200 reports the stored RSRP values to the cellular network 100 according to the step 404 of the method 400. The cellular network 100 receives the report according to the step 504 of the method 500.

In an extended embodiment, the mobile device 200 is adapted to receive and analyze Global Positioning System (GPS) signals for computing location data and/or to measure data of sensors integrated into the mobile device 200. The mobile device 200 periodically stores the data according to the step 402 of the method 400. The mobile device 200 stores records, each of which includes the measured RSRP values in association with the location data and/or the sensor data, as well as a timestamp, in the step 402. If no value has been measured in the period underlying the report, the value may include "NaN". Based on the records reported in the step 404 by the mobile device 200 and received in the step 504 by the cellular network 100, the cellular network 100 reconstructs the trajectory of the mobile device 200 and identifies a segment of the trajectory in the coverage hole 118.

Figure 7:
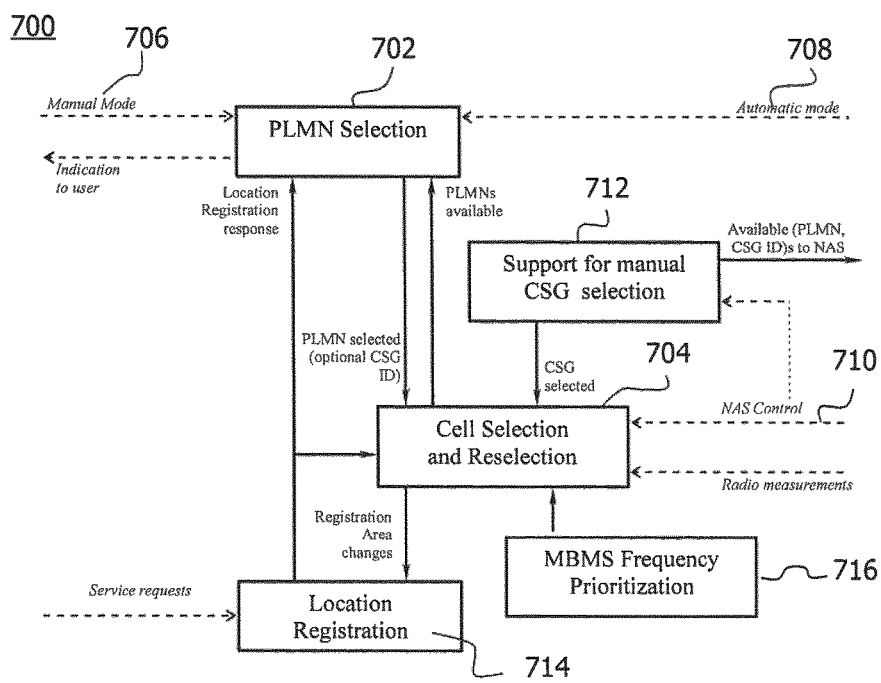
FIG. 7 schematically illustrates processes performed by the mobile device of FIG. 2 in a Radio Resource Control (RRC) idle mode.

Embodiments described with reference to FIG. 6 perform measurements as examples for the events recorded according to the step 402. Alternative or additional events in the RRC idle mode are described with reference to FIG. 7. FIG. 7 schematically illustrates a flowchart 700 indicating processes of the RRC idle mode.

The mobile device 200 is also referred to as a User Equipment (UE) in an implementation according to UMTS, LTE or a combination thereof. A Radio Access Network (RAN) of the cellular network 100 is also referred to as UTRAN and E-UTRAN in the UMTS implementation and the LTE implementation, respectively. Connection management between the mobile device 200 and the RAN is performed according to an RRC protocol maintaining two mutually exclusive modes, namely, the RRC idle mode and the RRC connected mode. No signaling radio bearer is assigned to the mobile device 200 in the RRC idle mode. In other words, there is no RRC connection and, thus, data transfer from the mobile device 200 to the cellular network 100 is not possible in the RRC idle mode. The location of the mobile device 200 is known to the cellular network 100 in terms of Tracking Areas (and not on a level of individual cells 102 to 108) in the RRC idle mode. In the RRC connected mode, the mobile device 200 has an RRC connection established, data transfer is possible, and the location of the mobile device 200 is known to the cellular network 100 on the level of individual cells.

In the RRC idle mode, the mobile device 200 executes several idle mode processes, such as a PLMN selection process 702, a RAT selection process, and a cell selection and reselection process 704. When the mobile device 200 is powered on or upon recovering from the coverage hole 118, the mobile device 200 selects an appropriate PLMN. The PLMN selection 702 can be done manually or automatically. As indicated at reference sign 706, a preferred PLMN is set by a user of the mobile device 200 in the manual mode. In the automatic mode indicated at reference sign 708, the PLMN is selected based on information stored in the mobile device 200, e.g., the most recently used PLMN.

The mobile device 200 searches for the strongest cell on each carrier and reads the system information provided by the cell, in order to find out, to which one or more PLMNs the cell belongs. In terms of a protocol stack within the mobile device 200, an Access Stratum (AS) reports each PLMN found to a Non-Access Stratum (NAS). The NAS is responsible for selecting the appropriate PLMN. The NAS includes a protocol for messages exchanged between the mobile device 200 and network nodes of a core network of the cellular network 100, e.g., between the mobile device 200 and the network node 300.

The found PLMN is reported as "high quality PLMN", if the measured RSRP value is greater than or equal to −110 dBm. Found PLMNs, which do not satisfy the high-quality criterion, and for which the mobile device 200 has been able to read the PLMN identities, are reported to the NAS together with the corresponding RSRP value according to standard document 3GPP TS 36.304 (Version 11.6.0), Sect. 5.1.

Optionally, the mobile device 200 optimizes the PLMN selection 702 by searching for cells based on stored information, e.g., carrier frequencies and/or cell parameters, from previously received measurement control information elements. The PLMN selection 702 can be stopped upon request of the NAS according to standard document 3GPP TS 36.304 (Version 11.6.0), Sect. 5.1.2.2. Once the mobile device 200 has selected the PLMN in the process 702, the cell selection and reselection process 704 is performed, in order to select a suitable cell of the selected PLMN to camp on.

In the cell selection and reselection process 704, the mobile device 200 searches for a suitable cell of the selected PLMN and chooses the selected cell to obtain information as to available services by tuning to a control channel of the selected cell. The cellular network 100 optionally controls the RATs, for which the cell selection is to be performed, for instance by indicating one or more RATs associated with the selected PLMN according to standard document 3GPP TS 36.304 (Version 11.6.4), Sect. 5.2.1. Optionally, the NAS maintains a list of forbidden registration areas and/or a list of equivalent PLMNs, as is indicated at reference sign 710.

In addition to the cell selection and reselection process 704, a manual selection 712 of Closed Subscriber Group (CSG) cells is supported by the mobile device 200 upon request from higher layers of the protocol stack.

The mobile device 200 selects the suitable cell based on the measurements in the RRC idle mode and cell selection criteria including the RSRP value, as detailed in standard document 3GPP TS 36.304 (Version 11.6.0), Sect. 5.2.3.2.

Based on the selected cell, the mobile device 200 registers its presence in the Tracking Area of the selected cell and the selected RAT, as is indicated at reference sign 714. If the location registration is successful, the selected PLMN becomes a registered PLMN.

Since the radio coverage is an important characteristic of the cellular network 100, the mobile device 200 always selects the best cell of the cellular network 100 to camp on in the RRC idle mode. According to standard documents 3GPP TS 36.304 (Version 11.6.0) and 3GPP TS 25.304 (Version 11.5.0), there are two different categories of cells based on a level of service provided by the cellular network 100, when the mobile device 200 camps on the respective cell. An "acceptable cell" is a cell, on which the mobile device 200 may camp to obtain limited services, e.g., emergency calls. The "acceptable cell" fulfills the following requirements: the cell is not barred, and the cell selection criteria are fulfilled.

The second category is a "suitable cell", on which the mobile device 200 may camp to obtain normal service. To this end, the mobile device 200 should have a valid Universal Subscriber Identity Module (USIM). The "suitable cell" fulfills the requirements of the "acceptable cell" and is further part of the selected PLMN, the registered PLMN or a PLMN of the list of equivalent PLMNs.

Within the RRC idle mode, the mobile device 200 assumes a "camped normally state", if the mobile device 200 camps on the "suitable cell" (cf. standard document 3GPP TS 25.304, Release 11, Sect. 5.2.2.2). The mobile device 200 assumes a "camped on any cell state", if the mobile device 200 camps on the "acceptable cell" (cf., loc. cit., Sect. 5.2.2.5). If the mobile device 200 fails to successfully register on any cell of the cellular network 100, e.g., in the coverage hole 118, the mobile device 200 assumes an "any cell selection state" (cf., loc. cit., Sect. 5.2.2.4).

Figure 8:
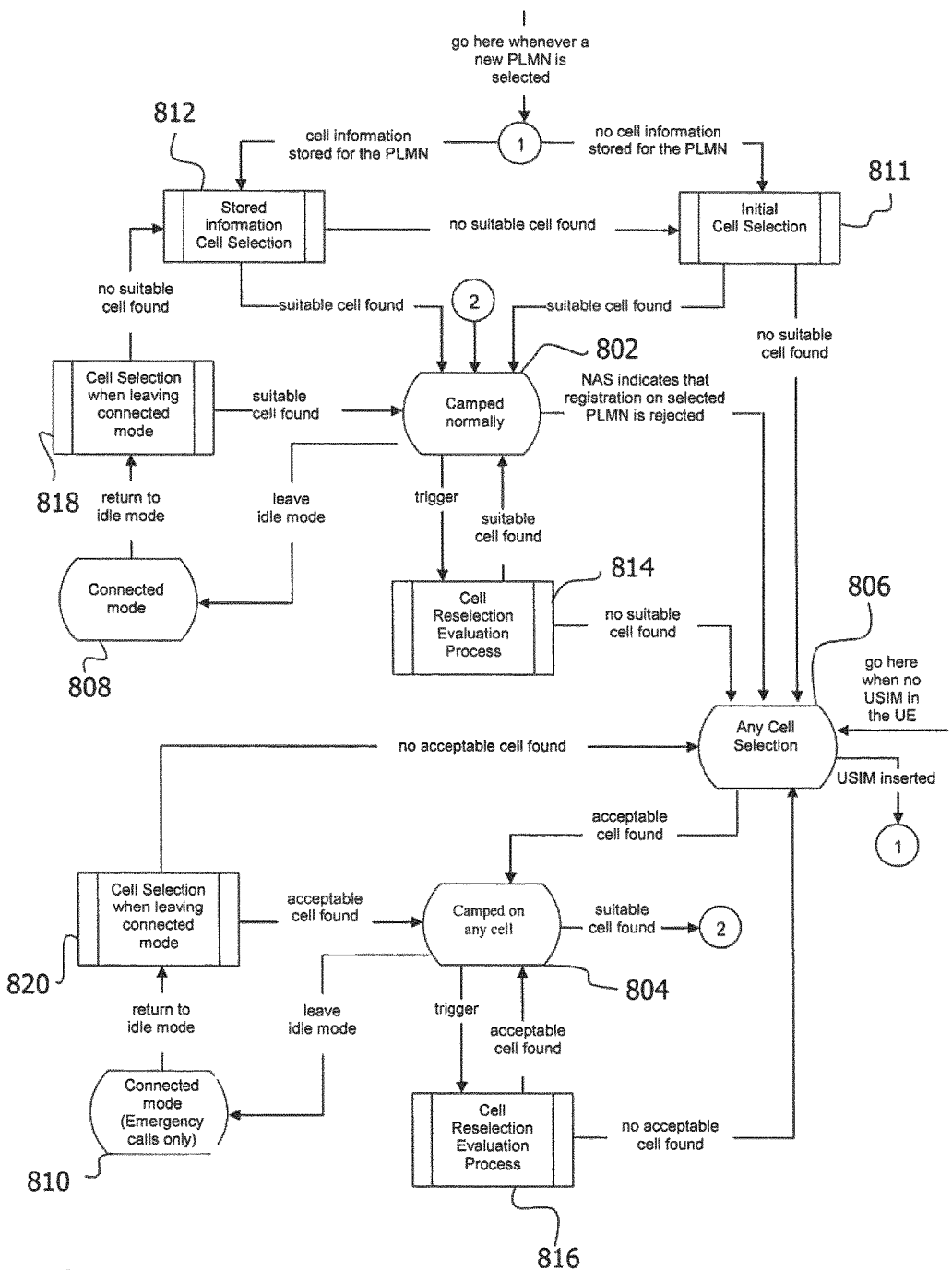
FIG. 8 shows a flowchart for a selection and reselection process in the RRC idle mode.

Further details of the cell selection and cell reselection process 704 in the RRC idle mode are shown in an event diagram 800 in FIG. 8. The "camp normally state", the "camped on any cell state" and the "any cell selection state" are indicated at reference signs 802, 804 and 806, respectively. The transition to the RRC connected mode after camping on a "suitable cell" or on an "acceptable cell" is indicated at reference signs 808 and 810, respectively.

In the absence of prior knowledge as to carriers, the mobile device 200 performs an initial cell selection procedure 811. The initial cell selection procedure 811 includes scanning all radio frequency channels in the E-UTRA bands according to the capabilities of the mobile device 200 to find a "suitable cell". On each carrier frequency, the mobile device 200 needs to search only for the strongest cell. Once a suitable cell is found, this cell is selected by the mobile device 200 to camp on in the state 802.

If cell information as to carrier frequencies and, optionally, as to cell parameters is stored or available from previously detected cells, the mobile device 200 performs a stored information cell selection procedure 812. Once the mobile device 200 has found a suitable cell, the mobile device 200 selects the cell to camp on in the state 802. If no suitable cell is found in the procedure 812, the procedure 811 is performed.

When the mobile device 200 camps on a cell in the state 802 for the "suitable" cell or in the state 804 for the "acceptable" cell, the mobile device 200 regularly searches for a better cell in terms of higher RSRP value. When a better cell is found, the mobile device 200 performs a cell reselection procedure 814 and 816, respectively. As a result, the mobile device 200 camps on the better cell. The change of the selected cell optionally implies a change of the RAT.

Furthermore, cell selection procedures 818 and 820 are performed, when returning from the RRC connected modes 808 and 810, respectively, to the RRC idle mode.

The procedures 811, 812, 814, 816, 818 and 820 are implementation examples for the cell selection and reselection process 704. As to the cell reselection procedures 814 and 816, the mobile device 200 is capable of service continuity for Multimedia Broadcast Multicast Services (MBMS) by assigning a higher priority to a cell according to an MBMS frequency prioritization 716.

Any subset of the states and procedures indicated in the event diagram 800 for the RRC idle mode and/or transitions between the states or procedures may be recorded as events in the step 402 of the method 400.

The extent of the recorded events is specified in the configuration message of the step 502 of the method 500.

The technique allows configuring the mobile device 200 to store the records of the events, including measurements, as well as, cell selection and reselection events, including the failure of these events, in any state of the RRC idle mode of the mobile device 200, e.g., in implementations of UTRAN and E-UTRAN systems. Thereby, all available measurements and state changes monitored by the mobile device 200 in the RCC idle mode are recorded and reported the next time the mobile device 200 connects to the cellular network 100.

The configuration message can be implemented as an extension of a conventional Logged Measurements Configuration RRC message (which is specified in standard document 3GPP TS 37.320, Release 11). The configuration specified by the configuration message enables the mobile device 200 to log measurement results and state transitions not only while the mobile device is in the "camped normally state" 802, but also in the states 804 and 806. The configuration optionally specifies a continuous or periodic logging. The configuration message specifies at least one RAT and a set of measurements, e.g., RSRP and RSRQ for E-UTRA, or Received Signal Code Power (RSCP) and received energy per chip divided by the power density in the band (Ec/No) for UTRA according to standard document 3GPP TS 37.320 (Release 11). Optionally, the configuration message specifies a Tracking Area (e.g., in terms of one or more specific cells), for which records of the events are to be stored.

The technique is implementable by extending the existing logged MDT functionality in RAN protocols as well as by extending existing RLF reporting functionality. Alternatively, the technique can be implemented in the application layer (e.g., transparent to the RAN protocols).

Based on the reports received in the step 504 of the method 500, the cellular network 100 is able to identify the coverage hole 118. Furthermore, the cellular network 100 is able to optimize RRC idle mode parameters, e.g., by evaluating different idle mode procedures and state transitions included in the report.

Alternatively or addition to the measurements, procedures and states in the RRC idle mode, the mobile device 200 stores records of events related to a radio link failure. When a radio link failure occurs, the mobile device 200 loses connectivity to the current cell of the cellular network 100. In addition to a conventional Radio Link Failure (RLF) report indicating, e.g., the last measurements performed for the source cell and/or for neighboring cells (e.g., intra-frequency cells, inter-frequency cells or inter-RAT cells) and/or indicating a handover command, if a handover has been initiated before the failure, the mobile device 200 continuously stores records of events after the failure. When the mobile device 200 recovers and reestablishes connectivity to the cellular network 100, the mobile device 200 indicates the availability of the RLF report. Upon request from the cellular network 100, e.g., the network node 300, the mobile device 200 sends the report in the step 404.

The configuration of the mobile device 200 performed by the cellular network 100 in the step 502 configures the mobile device 200 to collect information about incidents when no coverage is available for the mobile device 200, including the occurrence of the incident as well as circumstances of the incident. During the coverage outage, any radio signal measurement and, optionally, any sensor measurement of sensors integrated in the mobile device 200 is stored in the records. Furthermore, the information about the location of the outage and its extent in time and/or area is stored in the records. In an advanced implementation, the temporal and geographic information is linked or stored in association with the events in each record.

The events can be triggered by state transitions in the RRC idle mode. The records received in the step 504 enable the cellular network 100, e.g., the network node 300, to monitor cell selection or cell reselection procedures to discover cell ping-pongs and time spent in different RATs in the RRC idle mode.

The step 504 may be implemented as an extension of a conventional RLF report indicative of events, including measurements, for the time period while the mobile device is in the RRC idle mode and tries to select a suitable cell and to execute a recovery after the radio link failure.

The measurements performed by the mobile device 200 in the RRC idle mode are performed for one or more cells of the cellular network 100. E.g., due to low RSRP values, at least some of the records do not indicate a cell identifier, since the mobile device 200 is not able to read the cell identifier of the corresponding cell. The configuration message in the step 502 configures the mobile device 200 for performing and recording measurements without specifying a cell identifier.

Furthermore, the configuration message configures the mobile device 200 to perform and record measurements in different RATs, since the mobile device 200 may reestablish the RRC connected mode 808 or 810 with the cellular network 100 in a RAT other than the RAT that served a call prior to the radio link failure (cf. standard documents 3GPP TS 32.442 and 3GPP TS 32.422, Release 11).

Exemplary records of the events are described in what follows. Embodiments of the technique can implement any sub-combination of the described records.

When the mobile device 200 is switched on or upon recovery from lack of coverage (e.g., when leaving the coverage hole 118), the mobile device 200 performs the PLMN selection procedure 702 by scanning all radio frequency channels. Each time the mobile device 200 finds a PLMN, the event is logged together with an event indicator (e.g., "PLMN found"), a timestamp, the found PLMN identifier, the RSRP value, the RSRP value and the RSRQ value of the strongest cell, and the RAT of the strongest cell.

When the NAS has requested to stop the search for PLMNs and the mobile device 200 has selected an appropriate PLMN, the event of successful PLMN selection is recorded together with the following information: an event indicator (e.g., "PLMN selected"), a timestamp, the selected PLMN identifier, the RSRP value and the RSRQ value of the strongest cell, and the RAT of the strongest cell.

As illustrated in FIG. 7, after PLMN selection 702, the mobile device 200 performs the cell selection and reselection process 704. Each change in the RRC state (e.g., the states 802 to 820) is an event recorded according to the step 402.

When the mobile device 200 enters the "camped normally state" 802, the following information is recorded: an event indicator (e.g., "camped normally state entered"), a timestamp, the selected cell identity, the selected RAT, information as to a previous event, any available measurement performed during the state change, and any available measurement logged for any other reason. The information as to the previous event includes a previous event indicator indicative of the previous state or the previous procedure.

The previous event indicator is set to "initial cell selection", if the procedure 811 is the previous procedure. Optionally, an attribute "stored information cell selection executed" is stored. The attribute is set to the value "true", if the stored information cell selection procedure 812 was executed before the procedure 811. Otherwise, the attribute is set to the value "false".

The previous event indicator is set to "stored information cell selection", if the procedure 812 is the previous event. The previous event indicator is set to "cell selection when leaving connected mode", if the procedure 818 is the previous event.

The previous event indicator is set to "cell reselection evaluation", if the procedure 814 or 816 is the previous event. Optionally, an attribute "intra-frequency cell reselection" is stored. The attribute is set to the value "true", if the frequency of the reselected cell is the same frequency as the frequency of the cell previously camped on. Otherwise, the attribute is set to the value "false".

The previous event indicator is set to "camped on any cell", if the state 804 is the previous event.

The available measurement performed during the state change includes the RSRP value and the RSRQ value of the selected cell and, optionally, other cells that have been evaluated.

When the mobile device 200 enters the "any cell selection state" 806, a record is stored according to the step 402 including an event indicator (e.g., "any cell selection"), a timestamp, information as to the previous state or process, any available measurement performed during the state change, and any available measurement logged for any other reason. The information as to the previous state or process is stored in a previous event indicator.

The previous event indicator is set to "camped normally", if the state 802 is the previous event. Optionally, a cause code of NAS rejection is included.

The previous event indicator is set to "initial cell selection", if the procedure 811 is the previous event. Optionally, an attribute "stored information cell selection executed" is included in the record. The attribute is set to the value "true", if the procedure 812 was executed before the procedure 811. Otherwise, the attribute is set to the value "false".

The previous event indicator is set to "cell reselection evaluation (no suitable cell)", if the procedure 814 is the previous event. The previous event indicator is set to "cell reselection evaluation (no acceptable cell)", if the procedure 816 is the previous event. The previous event indicator is set to "cell selection when leaving connected mode", if the procedure 818 or 820 is the previous event. Furthermore, the previous event indicator can be set to "no USIM in the UE".

When the mobile device 200 enters the "camped on any cell state" 804, a record is stored according to the step 402 including the following information: an event indicator (e.g., "camped on any cell"), a timestamp, a cell identifier of the cell camped on, the selected RAT, a previous event indicator, any available measurement performed during the state change, and any available measurement logged for any other reason. The previous event indicator is set to "any cell selection", if the state 806 is the previous event.

The previous event indicator is set to "cell reselection evaluation", if the procedure 814 or 816 is the previous event. Optionally, an attribute "intra-frequency cell reselection" is set to the value "true", if the frequency of the reselected cell is the same frequency as the cell previously camped on. Otherwise, the attribute is set to the value "false".

The previous event indicator is set to "cell selection when leaving connected mode", if the procedure 818 or 820 is the previous event.

When the mobile device 200 tries to establish an RRC connection (e.g., to enter the RRC connected mode 808 or 810) and the RRC connection establishment fails, an RRC Connection Establishment Failure (RCEF) report is generated. Details of the RCEF report are specified in standard document 3GPP TS 36.331 (Release 11), Sect. 6.2.2. The RCEF report is implemented as part of the UE Information Response message, e.g., in a field "ConnEstFailReport".

When the mobile device 200 successfully establishes an RRC connection to any one of the cells (e.g., the cell 108 when leaving the coverage hole 118), the method 400 includes storing in the step 402 not only the latest RCEF measurement and the reporting in the step 404 reports not only the latest RCEF measurement to the base station 116. The step 402 includes collecting and logging all of the RCEF reports generated while the mobile device 200 is in the coverage hole 118 and, optionally, earlier RCEF reports, e.g., upon leaving the cell 104. The reports received in the step 504 enable the cellular network 100 to gather information on failed RRC connection establishments.

The mobile device 200 may further store sensor data from sensors associated to the mobile device 200. Depending on the capability of the mobile device 200, the sensor data includes position information, e.g., according to the Global Positioning System (GPS) or the Assisted Global Positioning System (A-GPS), accelerometer information (optionally integrated with respect to time for representing movement), compass information (e.g., a direction of movement), a timestamp, and velocity (e.g., determined based on different sensor inputs).

In some embodiments, the sensor data may be included in the stored record. The sensor data is thus reported in the step 404.

The mobile device 200 further stores according to the step 402 and reports according to the step 404 information other than conventional MDT measurements. The stored and reported information includes positioning information, e.g., GPS coordinates and/or public Wi-Fi access point locations (e.g., a municipal wireless network, such as Google Wi-Fi).

The mobile device 200 further reports in the step 404 other PLMNs and other networks that the mobile device 200 has measured but was not able to select (for any reason including, e.g., weak single or failed authorization).

Such other networks include other RATs that have been detected by the mobile device 200 (e.g., by means of a broadcasted cell identifier) and/or other RATs that have been measured but have not been selected by the mobile device 200. Examples for such other RATs include other 3GPP RATs, Wi-Fi, Bluetooth and Short Range Radio Systems (e.g., NFC, RFID, Zig-Bee, UWB, etc.).

Some standard specifications include requirements for the RRC connected mode, which are stricter than requirements for the RRC idle mode, e.g., in terms of signal strength, signal quality or measurement capability by the mobile device 200. For instance, the mobile device 200 maintains the RRC connected mode when connected to the cellular network 100 according to an LTE implementation, even if the mobile device 200 moves into an area in which the signal quality of the Primary Synchronization Signal (PSS) and the Secondary Synchronization Signal (SSS) and/or Cell-specific Reference Symbols (CRS) do not fulfill the requirement for the RRC idle mode.

In an advanced implementation, the configuration message in the step 502 configures the mobile device 200 to report the quality of the PSS and the SSS, if the quality does not fulfil the RRC idle mode requirement, while the mobile device 200 is in the RRC connected mode. The report may further include records of any one of the measurements described above in the context of the RRC idle mode.

The reports received in the steps 504 are analyzed by the cellular network 100, e.g., by the network node 300. The analysis includes determining a user need for access in areas of lacking or insufficient coverage, e.g., the coverage hole 118. The desired access during non-coverage periods is reported in the step 404. Based on the reports received on the steps 504, an actual communication need is determined. In one embodiment, the mobile device 200 reports a number of user-initiated access attempts, a time of mobile device activity without radio access and/or an amount of data transferred in an area of insufficient coverage. Optionally, actual communication over alternative networks (e.g., Wi-Fi) is stored in the records according to the step 402. Furthermore, the amount of data communicated over the alternative networks in areas of lacking or insufficient coverage by the 3GPP cellular network 100 is stored.

Three exemplary embodiments for the configuration message according to the step 502 and for the reports according to the steps 404 and 504 are described. Any one of the three embodiments can be combined with the events and the stored records of events described above. The embodiments for the configuration message and the report are implemented based on extensions of conventional 3GPP protocols. In a variant of the embodiments, the measurements are configured and reported in the application layer, e.g., transparent to the 3GPP protocols.

In a first embodiment, conventional logged MDT mechanisms according to 3GPP TS 37.320 (Release 11) are extended for triggering and reporting any one of above events, e.g., any one of above measurements. A new field is introduced into the Logged Measurement Configuration RRC message to enable or disable the storing step 402. The same field is added to the Itf-N message used to initiate a logged MDT Trace Job. For the reporting of measurement results according to the steps 404 and 504, the existing procedure, e.g., the RRC Connection Setup Complete Message, is used as an indicator for reporting the logged MDT measurements during RRC connection establishment (cf. standard document 3GPP TS 37.320, Sect. 5.1.1.3).

Alternatively, the storing according to the step 402 is triggered by an RLF incident. The configuration message in the step 502 indicates whether the storing according to the step 402 is triggered by the RLF incident or records of the events are continuously stored. For this purpose, a further new field is introduced in the corresponding RRC and Itf-N messages. The first embodiment is also referred to as integration into logged MDT.

In a second embodiment, the RLF reporting functionality is used for triggering the storing and for reporting the records stored according to the step 402 after an RLF has occurred. For example, the existing RLF reporting mechanism is used to report the records stored according to the step 402 during the RRC idle mode in an RRC message, e.g., the UE Information Response Message. Additional Information Elements (IEs) are introduced in the RLF report message element for each of the stored reports. The second embodiment is also referred to as integration into RLF reporting.

A third embodiment expands an immediate MDT to trigger and report the records stored according to the step 402 after an RLF has occurred. The configuration message in the step 502 (which is also referred to as management order or MDT order) includes an "any cell selection" parameter signaled over the Itf-N interface. The immediate MDT measurements are complemented with logged MDT measurements according to the step 402, if the radio connection is lost (e.g., due to RLF). When a RAN node in the cellular network 100 receives the MDT order, the RAN node sends the configuration message according to the step 502.

The configuration message configures the mobile device 200 for an immediate MDT measurement session and also a logged MDT measurement session according to the step 402 for "any cell selection". The logged MDT measurement session is a specific session that initiates the recording of the measurements according to the step 402, when the RLF occurs. Both the immediate MDT measurement session and the logged MDT measurement session may use the same Trace Reference and the same Trace Recording Session Reference, e.g., the references originally allocated for the immediate MDT measurement session. Latter implementation of the third embodiment avoids allocating further Trace Reference and Trace Recording Session Reference for the specific type of logged MDT measurement session by reusing the corresponding references of the immediate MDT measurement session. The third embodiment is also referred to as integration to immediate MDT in case of RLF.

Any one of afore-mentioned embodiments can be varied by configuring and reporting on the application layer. A dedicated software application is deployed in the mobile device 200. The dedicated software application fetches radio measurements and status information from lower layers of the protocol stack of the mobile device 200, e.g., over specified Application Programming Interfaces (APIs, e.g., an Android API). The dedicated software application transfers the stored records in a user plane of the cellular network 100 to a server node. The transfer can be implemented transparently for the RAN protocols of the cellular network 100.

The information available for the records can be more detailed in embodiments implemented based on the RAN protocols. In the variant implemented in the application layer, a subset of the measurements performed on the physical layer is reported. The reporting in the application layer can be used to complement radio measurement information with a terminal status on an application level. E.g., the application level information indicates, if the user of the mobile device 200 is actively using one or more applications at the time the RLF occurs, or if one or more applications are causing background communication that is ongoing at the time the RLF occurred (such as an e-mail client application periodically querying an e-mail server).

Figure 9:
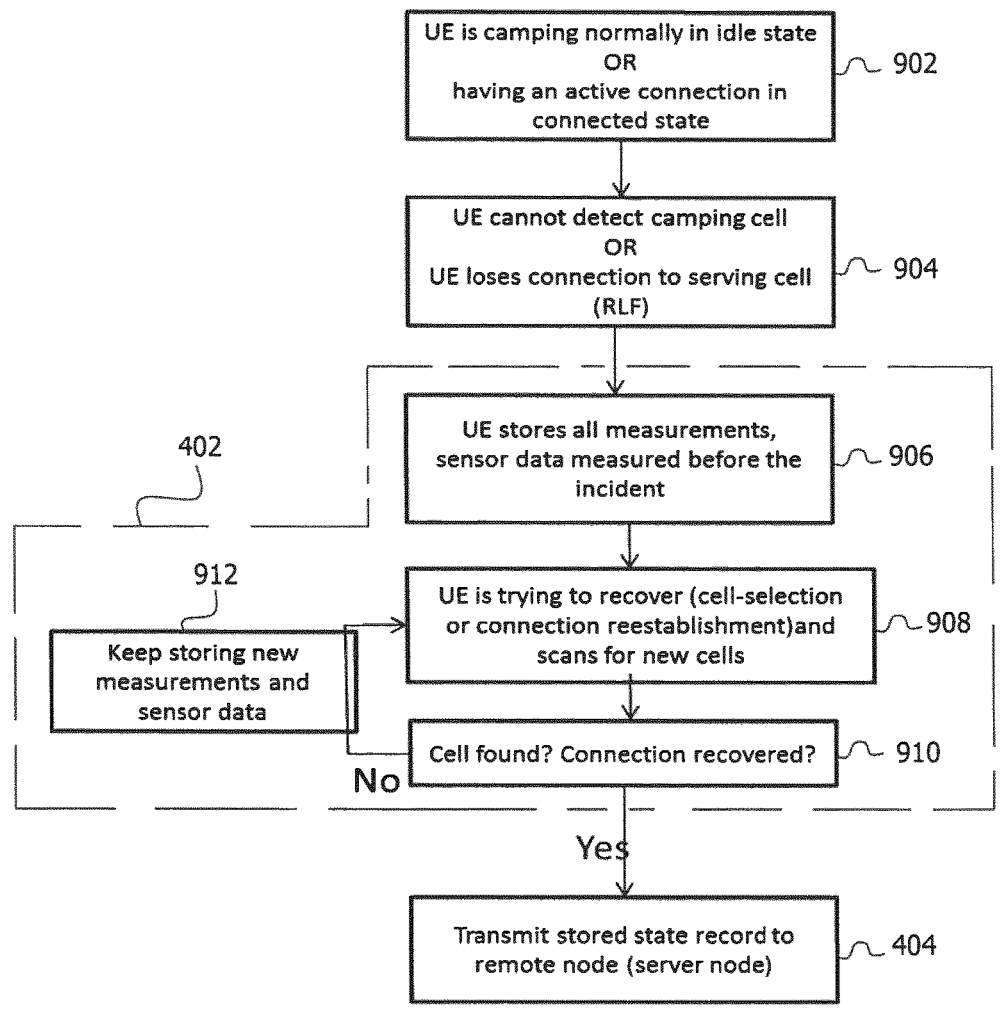
FIG. 9 shows a flowchart for an exemplary implementation of the method of FIG. 3 in the context of the process of FIG. 8.

FIG. 9 shows a flowchart of a more detailed implementation of the method 400 performed by the mobile device 200 along the trajectory shown in FIG. 6. In a step 902, the mobile device 200 is normally camped in the RRC idle mode on the cell 104, or the mobile device 200 is in the RRC connected mode served by the cell 104. The step 902 is performed in the situation indicated at reference sign 602 in FIG. 6.

In a step 904 of the method 400, the mobile device 200 fails to detect a cell to camp on, or the mobile device 200 loses the radio connection to the serving cell. The step 904 occurs as the mobile device leaves the coverage area of the cell 104 shown in FIG. 6.

According to step 906, the mobile device 200 stores all measurement data, including sensor data, which is measured before the occurrence of the step 904. The step 906 is a sub-step of the step 402. The step 906 is performed in the situation 604 shown in FIG. 6.

As long as the mobile device 200 is in the coverage hole 118, the mobile device 200 tries to recover by scanning for cells in a step 908. A subsequent step 910 assesses whether or not a cell has been found. The steps 908 and 910 are repeated as long as no cell is found. The repetition includes a step 912 of periodically storing records of events. The step 912 is a further sub-step of the step 402.

As soon as a connection to the cellular network has been established in the step 910, upon request by the network and/or independently from sending PLM information, the stored records are reported according to the step 404.

The reports received according to the step 504 from a plurality of different mobile devices 200 are analyzed in the cellular network 100. The RSRP values included in the reports (e.g., in an UTRAN implementation or corresponding measurements in a GSM implementation) are collected, e.g., by means of a histogram, according to at least one of an associated cell identifier, an associated RRC state, an associated RRC state transition, an associated timestamp and associated location information.

The time spent in the "any cell selection state" 806 is calculated based on a difference between the timestamp of the event "any cell selection state entered" and the timestamp logged for the event indicated by the previous event indicator reported for the state 806. The time spent in the state 806 indicates a duration of the lack of coverage (e.g., within the coverage hole 118). The coverage hole 118 is located based on the location information available from the logged MDT measurements (e.g., according to standard document 3GPP TS 37.32, Release 11) or from RLF reports.

The time spent in the "camped on any cell state" 804 is calculated based on the timestamp of the event "camped on any cell state entered" and the timestamp logged for the event indicated by the previous event indicator reported for the state 804. The time spent in the state 804 indicates a duration of insufficient coverage, e.g., limited coverage in terms of service provided by the cellular network 100 (e.g., availability of emergency calls only).

The measurement reports received in the step 504, e.g., measurement reports from all states in the RRC idle mode, support a configuration of RRC idle mode parameters. One or more of the RRC idle mode parameters listed in Sect. 5.2.4.7 of standard document 3GPP TS 36.304 (Release 11) can be specified based on the reports. For instance, in the cell reselection procedure 814 or 816, a parameter $Q_{offset}$ specifies an offset in signal strength between two cells. The parameter $Q_{offset}$ is optimized based on overlaps among cells. The overlap is obtained from RSRP values included in the reports of measurements for the current cell and one or more neighboring cells.

Inter-RAT ping-pongs in the RRC idle mode are detected by the cellular network 100 based on reports of the event "camped normally state entered". Records for these events are stored according to the step 402 each time a cell selection occurs. By comparing the cell identifier of the selected cell in consecutive reports received in the step 504, the number of ping-pong cell selections is calculated by the cellular network 100.

In a heterogeneous network including different Radio Access Technologies (RATs), e.g., including 3GPP RAT and one or more non-3GPP base stations, the record reported via one RAT may indicate that another RAT lacks coverage. The technique may be combined with a reporting mechanism on the application layer. For example, responsive to accessing Wi-Fi, the application (e.g., the mobile client application dedicated to the reporting mechanism) reports the lack of 3GPP coverage over the Wi-Fi network. As a further example, when the mobile device 200 is roaming abroad and accessing one 3GPP operator, the application reports lack of coverage for another 3GPP operator. The operator may provide a corresponding application to customers for download. Such an "access help app" provides an efficient tool for network planning.

As has become apparent based on above exemplary embodiments, at least some of the embodiments enable collecting measurements, e.g., MDT measurements, also when a mobile device cannot select a suitable cell, e.g., when the mobile device is in a coverage hole. In exemplary embodiments, collecting MDT measurements is enabled after a radio link failure, e.g., along a trajectory of the mobile device until the mobile device finds a suitable cell again. Exemplary embodiments also enable inter-RAT measurements and logged MDT measurements.

Same or other embodiments determine a correlation of MDT measurements between the connected mode and the idle mode. The determination of a coverage map can be facilitated or enhanced.

Some embodiments of the technique automatically optimize idle mode parameters based on the reports. Radio link failure problems can be analyzed in more detail. Cases of cell "ping-pong" in the idle mode can be discovered.

The technique can be used for an efficient buildout or upgrade of a cellular network and/or for improving network coverage.

It will be apparent to those skilled in the art that the embodiments described above may be adapted or extended in various ways. Accordingly, the scope of the invention is defined only by claims.

The invention claimed is:

1. A method of reporting events from a mobile device to a cellular network to which the mobile device is wirelessly connected, the method comprising:

storing records of the events while the mobile device is out of the cellular network coverage, wherein the records are continuously stored while the mobile device is out of the cellular network coverage, wherein the mobile device stores the records of the events upon reception of a configuration message from the cellular network, which specifies the events that are to be recorded, wherein the configuration message further specifies a tracking area of one or more selected cells of the cellular network for which the records of the events are to be stored, wherein the mobile device further stores records of the events occurring directly before the mobile device is out of the cellular network coverage; and reporting the stored records to the cellular network when the mobile device is wirelessly connected to the cellular network;

wherein the mobile device is out of the cellular network overage if the mobile device is in a Radio Resource Control (RRC) idle mode and is not:

camped on any cell of the cellular network; or camped on the cell of the cellular network according to a specific Public Land Mobile Network (PLMN) identity of the cell, wherein the specific PLMN is selected to camp the mobile device with the cell of the cellular network upon recovering from the out of the cellular network coverage based on the events stored when the mobile device is in out of the cellular network coverage.

2. The method of claim 1, wherein the mobile device reports the records when the mobile device is in an RRC connected mode.

3. The method of claim 1, wherein the mobile device further stores the records of the events occurring directly after the mobile device is reconnected.

4. The method of claim 1, wherein the events include changes of a Radio Resource Control (RRC) state.

5. The method of claim 1, wherein the events include at least one of cell selection, cell reselection, and reception of a PLMN identity provided by one or more cells of the cellular network.

6. The method of claim 1, wherein the events include measurements performed by the mobile device.

7. The method of claim 6, wherein:

the measurements include measurements performed by sensors integrated into the mobile device; and wherein the reports include sensor data.

8. The method of claim 6, wherein the measurements include at least one of a Reference Signal Received Power (RSRP) measurement, a Reference Signal Received Quality (RSRQ) measurement, and sensor measurements.

9. The method of claim 1, wherein the events include detections of non-cellular Radio Access Technologies.

10. The method of claim 1, wherein the records of the events are stored and reported according to a Radio Access Network (RAN) protocol or an application protocol.

11. The method of claim 1, wherein the configuration message comprises a configuration command that configures the mobile device to store the records while the mobile device is out of the cellular network coverage.

12. The method of claim 11, wherein the configuration message specifies a Minimization of Drive Test (MDT) Measurement Configuration.

13. The method of claim 11, wherein at least one of:
the configuration message is an RRC Connection Reconfiguration message and the configuration command specifies an Immediate Minimization of Drive Test (MDT) measurement;
wherein the configuration message is a Logged Measurement Configuration message and the configuration command specifies a Logged MDT measurement.

14. The method of claim 1, wherein the stored records are reported as part of a Radio Link Failure (RLF) report.

15. The method of claim 1, wherein the stored records relate to an unsuccessful handover attempt.

16. The method of claim 1, wherein each record of said records includes at least one of a timestamp and location information.

17. A method of receiving events reports from a mobile device at a cellular network to which the mobile device is wirelessly connected, the method comprising:
the cellular network sending the mobile device a configuration message for configuring the mobile device to store records of the events while the mobile device is out of cellular network coverage, wherein the configuration message specifies a continuous storing of the records while the mobile device is out of the cellular network coverage, wherein the configuration message specifies the events that are to be recorded and a tracking area of one or more selected cells of the cellular network for which records of the events are to be stored, wherein the configuration message further configures the mobile device to store the records of the events occurring directly before the mobile device is out of the cellular network overage; and
the cellular network receiving, from the mobile device, the stored records when the mobile device is wirelessly connected to the cellular network,
wherein at least one of:
the configuration message configures the mobile device to store the records of events in a Radio Resource Control (RRC) idle mode if the mobile device is not normally camped on a cell of the cellular network; and
the cellular network receives the records when the mobile device is in an RRC connected mode.

18. The method of claim 17, wherein the configuration message is sent via a Northbound Interface (ltf-N).

19. The method of claim 17:
wherein the configuration message is sent to a plurality of different mobile devices;
further comprising analyzing the records received from the plurality of different mobile devices.

20. A mobile device for reporting events from a mobile device to a cellular network to which the mobile device is wirelessly connectable, the mobile device comprising:
processing circuitry;
memory storing instructions executable by the processing circuitry whereby the mobile device is operative to:
store records of the events while the mobile device is out of cellular network coverage, and to store records of the events occurring directly before the mobile device is out of the network coverage, wherein the records are continuously stored while the mobile device is out of the cellular network coverage,
wherein the mobile device stores the records of the events upon reception of a configuration message from the cellular network, which specifies the events that are to be recorded, wherein the configuration message further specifies a tracking area of one or more selected cells of the cellular network for which the records of the events are to be stored; and
report the stored records to the cellular network when the mobile device is wirelessly connected to the cellular network.

21. A device in a cellular network for receiving events reports from a mobile device at the cellular network to which the mobile device is wirelessly connectable, the device comprising:
processing circuitry;
memory storing instructions executable by the processing circuitry whereby the device is operative to:
send, from the cellular network to the mobile device, a configuration message for configuring the mobile device to store records of the events while the mobile device is out of the cellular network coverage, wherein the configuration message specifies a continuous storing of the records while the mobile device is out of the cellular network coverage, wherein the configuration message specifies the events that are to be recorded and a tracking area of one or more selected cells of the cellular network for which records of the events are to be stored, wherein the configuration message further configures the mobile device to store the records of the events occurring directly before the mobile device is out of the cellular network coverage; and
receive, from the mobile device at the cellular network, the stored records when the mobile device is wirelessly connected to the cellular network.

* * * * *